United States Patent
Stephens

(10) Patent No.: US 8,467,325 B2
(45) Date of Patent: Jun. 18, 2013

(54) MULTIPLE-INPUT NETWORK NODE WITH POWER-SAVING STATE

(75) Inventor: Adrian P. Stephens, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 2442 days.

(21) Appl. No.: 11/152,276

(22) Filed: Jun. 13, 2005

(65) Prior Publication Data

US 2007/0014235 A1 Jan. 18, 2007

(51) Int. Cl.
*H04B 1/16* (2006.01)
(52) U.S. Cl.
USPC .......................................... 370/311; 455/335
(58) Field of Classification Search
USPC ....... 455/132, 335, 553.1, 446–442; 370/335, 370/436, 328, 338
See application file for complete search history.

(56) References Cited

U.S. PATENT DOCUMENTS

| | | | |
|---|---|---|---|
| 7,340,615 B2 * | 3/2008 | Krantz et al. | 713/300 |
| 2004/0103204 A1 * | 5/2004 | Yegin | 709/229 |
| 2005/0197080 A1 * | 9/2005 | Ulupinar et al. | 455/135 |
| 2006/0221914 A1 | 10/2006 | Waxman | |

OTHER PUBLICATIONS

Wilson, James M., "The Next Generation of Wireless LAN Emerges with 802.11n," Technology@Intel Magazine, Aug. 2004, pp. 1-8, accessed Jun. 13, 2005.

* cited by examiner

*Primary Examiner* — Alex Skripnikov
(74) *Attorney, Agent, or Firm* — Schwabe, Williamson & Wyatt, P.C.

(57) ABSTRACT

Embodiments of apparatuses, methods, and systems for providing a multiple-input network node with power-saving state are generally described herein. In some embodiments, the network node may include a management entity to control first and second receive chains in different manners depending on the receive-capability state of the network node. If the network node is in the first state, both receive chains may cooperate to receive communication from another network node. If the network node is in the second state, which is a reduced-capability state, the second receive chain may alternate between a powered down mode and a scanning mode. Other embodiments may be described and claimed.

24 Claims, 2 Drawing Sheets

MULTIPLE-INPUT NETWORK NODE WITH POWER-SAVING STATE

TECHNICAL FIELD

Embodiments of the present invention relate generally to the field of networks, and more particularly to a power-saving state in a multiple-input network node.

BACKGROUND

Wireless local area networks (WLANs) may include devices capable of receiving communication through more than one receive chains. Such a component may be referred to as a multiple-input device. A multiple-input device may improve the sensitivity of the device, thereby allowing for greater range of transmissions. A multiple-input device may also improve the throughput, thereby allowing for faster transmissions. While multiple receive chains may improve performance and/or range, they may also require greater power consumption.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Illustrative embodiments of the present invention may include a multiple-input network node having a reduced-capability state that alternates a receive chain between a power-down mode and a scan mode.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific devices and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

Figure 1:
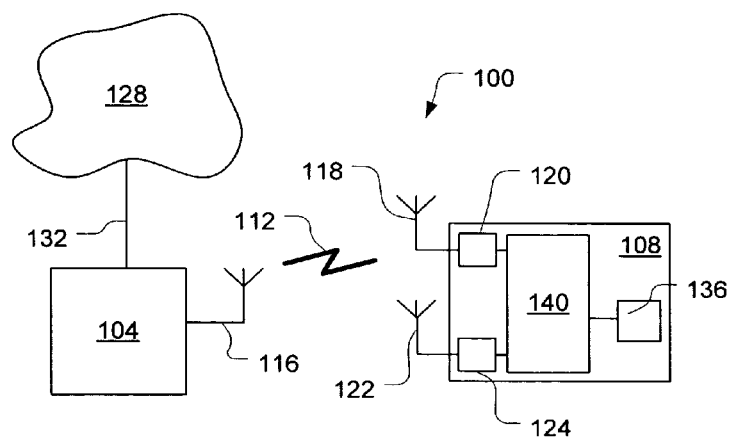
FIG. 1 illustrates a network in accordance with an embodiment of the present invention.

FIG. 1 illustrates a network 100 having network nodes 104 and 108 coupled to each other through a wireless medium 112 in accordance with an embodiment of the present invention. The network node 104 may have one or more antennae 116 to facilitate wireless transmission of data to/from the network node 108. The network node 108 may have a first antenna 118 coupled to a first receive chain 120 and a second antenna 122 coupled to a second receive chain 124 to facilitate wireless receipt of the data from the network node 104. The wireless medium 112, over which communication between the network node 104 and the network node 108 takes place, may have one or more channels within the radio-frequency (RF) and/or infrared (IR) wavelength ranges.

In various embodiments, the network node 104 may also have one or more transmit chains and/or receive chains (not shown), while the network node 108 may also have one or more transmit chains (not shown). In an embodiment, the network 100 may be a wireless local area network (WLAN).

In various embodiments, each transmit/receive chain may comprise one or more electronic elements, such as digital-to-analog (analog-to-digital) converters, frequency synthesizers, amplifiers, filters, and so forth.

In this embodiment, the network node 104 may be coupled to another network, e.g., a wide area network (WAN) 128 through a wired or wireless medium 132. The network node 104 may facilitate data transfers between one or more other network nodes, e.g., the network node 108, and the WAN 128. In this embodiment, the network node 104 may also be referred to as an access point 104, while the network node 108 may also be referred to as a station 108.

In one embodiment, the station 108 may include a mobile power source, e.g., a battery 136, to provide electrical energy to the station 108. The station 108, so equipped, may be a mobile device such as, but not limited to, a handheld computing device, a laptop computing device, and a wireless mobile phone. In another embodiment, the station 108 may be a desktop computing device configured for use with a stationary power source, e.g., a power outlet.

In an embodiment, the station 108 may have a management entity 140 coupled to the battery 136 and to the first and second receive chains 120 and 124. The management entity 140 may provide various control functions for the station 108 such as, but not limited to, arbitrating data transfers to and/or from the network 100 and/or power-state management of the station 108.

In one embodiment, the management entity 140 may switch the station 108 between two states depending at least in part on network conditions, e.g., an occurrence of a power-down event and/or an occurrence of a power-up event. The relevant events may be defined by a protocol governing the interactions among the nodes of the network 100. In various embodiments, the protocol governing network interactions may be a part of a standard such as one or more of the ANSI/IEEE 802.11 standards (IEEE std. 802.11-1999, reaffirmed Jun. 12, 2003) for wireless local area networks (WLANs), along with any updates, revisions, and/or amendments to such. In various embodiments, the network 100 may additionally or alternatively comply with other communication standards.

While the station 108 is in a first state, which may be referred to as a full-receive capability state, the management entity 140 may operate the receive chain 120 and the receive chain 124 in a cooperative manner to facilitate reception of data from another network node over a first channel of the medium 112. In this embodiment, the data may be received from the access point 104; however, in other embodiments the station 108 may receive data from other stations. The channel over which communication between the access point 104 and the station 108 occurs may be referred to as an operational channel. As mentioned above, in various embodiments the two receive chains 120 and 124 may work in tandem to allow for greater sensitivity and/or throughput. In various embodiments, the management entity 140 may control the receive chains 120 and 124 to receive data over the operational channel through any number of multiple-input techniques such as, but not limited to, spatial multiplexing, maximal ratio combining, and space-time block coding.

In an embodiment, the management entity 140 may control the station 108 to transition from the full-receive capability state to a reduced-receive capability state after an occurrence of a power-down event. While the station 108 is in a reduced-receive capability state, the management entity 140 may operate the receive chain 120 in a manner to enable receipt of data over the operational channel while the receive chain 124 is in either a power-saving mode or a scanning mode.

In the scanning mode, the receive chain 124 may sequentially tune-in to other channels of the medium 112 and wait a predetermined amount of time to hear a beacon frame from another access point before moving on to the next channel. If the beacon meets certain filtering criteria, e.g., it is sent to the service set which the station 108 is associated with, then the management entity 140 may store information about the beacon in a storage medium. This information may be used to determine other communication options provided to the station 108 over other channels. Information stored may include, but is not limited to, received signal strength, time of receipt, etc.

In one embodiment, a reception of a transmission by the receive chain 120 may potentially interfere with the scanning mode of the receive chain 124. Therefore, in this embodiment, the scanning mode may be temporarily suspended during receipt of such transmissions.

The stored information obtained through scanning may be used to establish a contingent access point if the communication provided by the operational channel with the access point 104 becomes disrupted, deteriorated, and/or insufficient to provide the quality of service (QoS) required by the station 108. A change in channel conditions may occur, e.g., when the station 108 is moving away from the access point 104. The information obtained through the scanning mode may facilitate faster re-association times and/or provide more consistent access to channels/access points capable of providing sufficient QoS for the station 108.

In the power-saving mode, the receive chain 124 may power down to a lower power consumption state such as standby, sleep, off, etc.

The receive chain 120 may also be referred to as the primary receive chain 120 because it may perform receiving functions while the station 108 is in both the full- and reduced-receive capability states. Conversely, the receive chain 124 may also be referred to as the secondary receive chain 124 because it may perform receiving functions to augment the receiving functions provided by the primary receive chain 120 while the station 108 is in the full-receive capability state and other functions while the station 108 is in the reduced-receive capability state. In this context, the terms primary and secondary are not intended to attach inherent valuations to the respectively labeled receive chains.

In one embodiment, while the station 108 is in a reduced-receive capability state, the management entity 140 may alternate the receive chain 124 between the scanning mode and a power-saving mode. Further discussion on the timing of the management entity 140 alternating the station 108 between the scanning, power-saving, and receive modes is found below.

Figure 2:
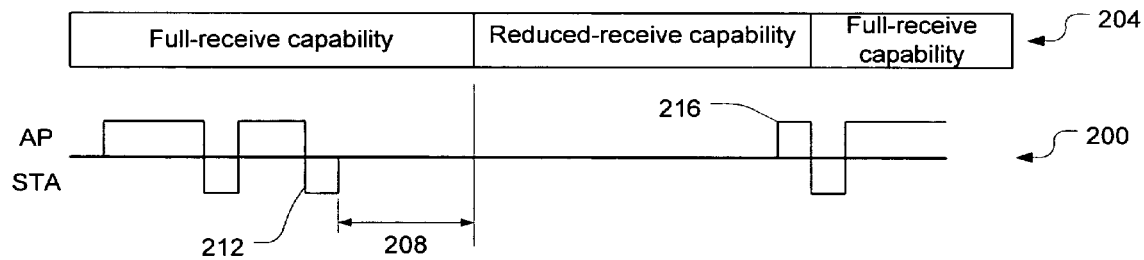
FIG. 2 illustrates waveform graphs for a communicative exchange between nodes of a network along with a corresponding capability-state cycle of a network node involved in the communicative exchange, in accordance with an embodiment of the present invention.

FIG. 2 illustrates a waveform graph 200 for a communicative exchange between the access point 104 and the station 108 along with a corresponding capability-state cycle 204 for the station 108, in accordance with an embodiment of the present invention. In this embodiment, a network protocol may define a power-down event as a certain amount of time passing after the station's 108 last transmission without the station 108 receiving a signal from the access point 104. This amount of time may also be referred to as stay-awake time 208. The management entity 140 may include a countdown timer set to the stay-awake time 208, which may be initiated following each frame transmission of the station 108 and reset at the reception of each signal addressed to the station 108 from the access point 104.

In the present embodiment, after the station 108 sends a frame 212 the management entity 140 may begin the countdown timer. Without receipt of a signal from the access point 104, the countdown timer will expire the stay-awake time 208 from when the frame 212 was sent. The management entity 140 may then interpret the expiration of the countdown timer as an occurrence of a power-down event.

After the power-down event, the management entity 140 may switch the station 108 from the full-receive capability state to the reduced-receive capability state. The management entity 140 may keep the station 108 in the reduced-receive capability state until network conditions, e.g., an occurrence of a power-up event, provides other motivation.

In an embodiment, the access point 104, having not communicated with the station 108 for some time, may assume the station 108 is in a reduced-receive capability state and may send a wake-up frame 216 prior to further transmissions. Receipt of this wake-up frame 216 may be the network condition that provides the power-up motivation for the station 108. The management entity 140 may receive this wake-up frame 216, via the receive chain 120, and may transition the station 108 back into the full-receive capability state for the remaining transmission from the access point 104. The transition back into the full-receive capability state may take priority over the scanning and/or power-down modes.

Figure 3:
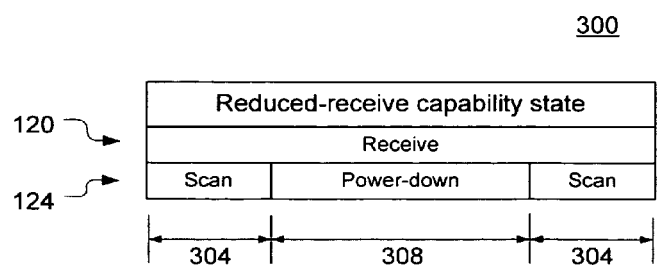
FIG. 3 illustrates a reduced-capability state cycle of a network node, in accordance with an embodiment of the present invention.

FIG. 3 illustrates a duty cycle of the receive chains 120 and 124 through a reduced-receive capability state 300 of the network node 108 in accordance with an embodiment of the present invention. Throughout the reduced-receive capability state, the receive chain 120 may continue to monitor the operational channel in a receive mode.

Upon the network node 108 first switching into the reduced-receive capability state, the management entity 140 may use the receive chain 124 for scanning channels of the medium 112 that are not being used as the primary communication channel by the receive chain 120. In various embodiments, the receive chain 124 may scan all of the available channels or a subset thereof. The scanning function may take place for a predetermined time 304. After the scanning, the management entity 140 may power-down the receive chain 124. In one embodiment, following a predetermined time 308 the management entity 140 may power up the receive chain 124 for another scan.

Various embodiments may additionally/alternatively consider parameters other than the predetermined time 308 prior to performing another scanning function. For example, if the quality of the primary receiving channel is dynamic (e.g., changing frequently), then there may be a high probability of a need for an impending re-association or alternative connection. In this embodiment, the management entity 140 may increase the frequency at which the scanning takes place so that the management entity 140 is updated with current communication options. If, on the other hand, the quality of the primary receiving channel is substantially stable, the management entity 140 may reduce the frequency at which the scanning takes place. This dynamic adjustment for alternating between the power-down and scanning modes may be determined based on a formulaic approach considering objectives of a particular embodiment in light of current network conditions.

In various embodiments, the station 108 may have additional receive chains. In one embodiment, these receive chains may power down for the entirety of the reduced-receive capability state, leaving the scanning functions to the receive chain 124.

Figure 4:
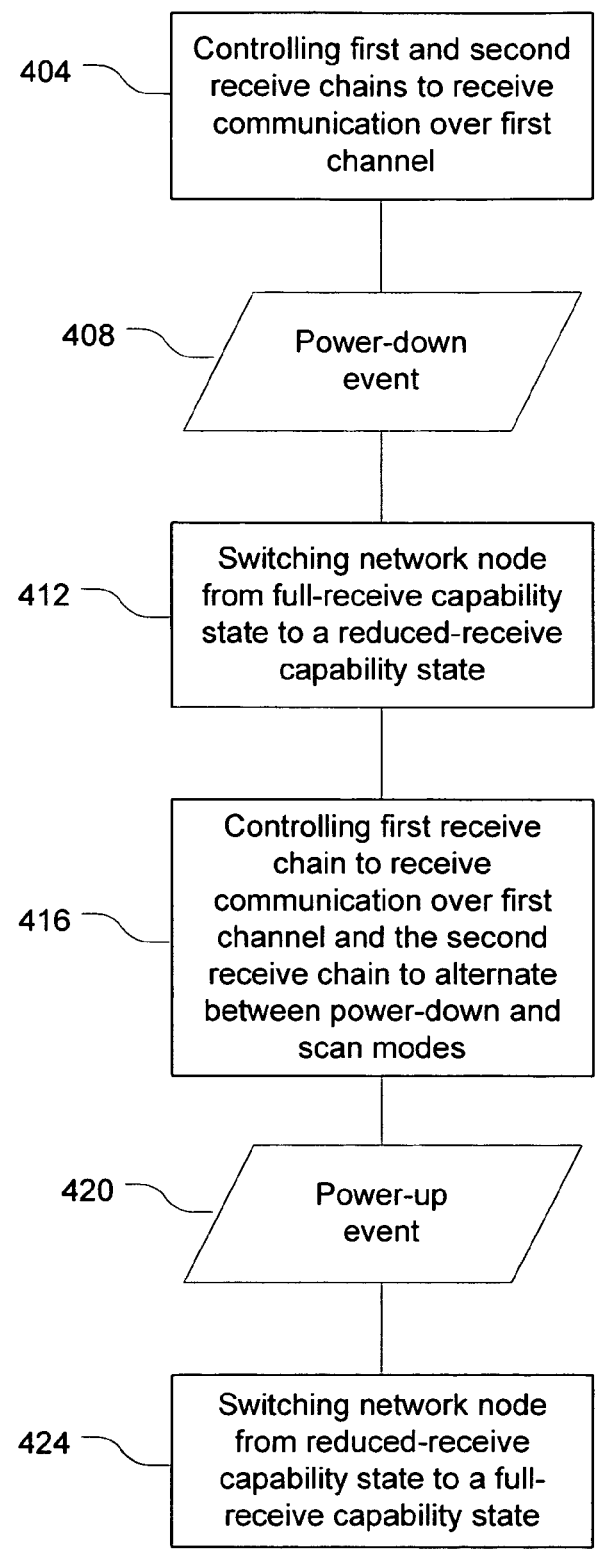
FIG. 4 illustrates a manner of controlling receive chains of a network node, in accordance with an embodiment of the present invention.

FIG. 4 illustrates a manner of operating a network node in accordance with an embodiment of the present invention. Elements discussed with reference to FIG. 4 may be similar to like-named elements described and discussed above.

In one embodiment, a management entity may control operation of a network node in a manner consistent with embodiments of the present invention. The management entity may include a storage medium with instructions stored therein. The management entity may also include a processor which may process the instructions to perform one or more of the following operations.

In one embodiment of the present invention, the management entity of the network node may control a first receive chain and a second receive chain of the network node in a manner to enable cooperative receipt of communication over an operational channel while the network node is in a full-receive capability state 404. In one embodiment a power-down event, which may be defined by a network protocol, may occur 408. The management entity may recognize the power-down event and switch the network node from the full-receive capability state to a reduced-receive capability state, based at least in part on the occurrence of the power-down event 412.

In one embodiment, while the network node is in the reduced-receive capability state the management entity may control the first receive chain in a manner to enable receipt of communication over the operational channel and the second receive chain in a manner to alternate between a power-down mode and a scanning mode while the network node is in a reduced-receive capacity state 416. The sequencing of the second receive chain alternating between the power-down and the scanning modes may be determined based on the particulars of a specific embodiment. For example, in one embodiment, the second receive chain may scan a number of channels, power down for a certain time period, and scan again after a predetermined time period has passed.

In one embodiment, a power-up event that is recognized by the management entity may occur 420. The power-up event may be defined by a network protocol similar to the power-down event. The management may switch the network node from the reduced-receive capability state to the full-receive capability state, based at least in part upon the occurrence of the power-up event 424. In one embodiment, the power-up event may be the management entity's receipt of a signal via the first receive chain, e.g., a wake-up beacon from an access point.

While the above embodiments refer to functions provided by a station and an access point, network nodes of other embodiments may not be restricted to being one or the other. For example, in an embodiment employing a peer-to-peer network, each network node may be capable of providing access point and/or station functionalities. Network nodes of embodiments of this invention may be arranged in a variety of communication networks such as, but not limited to, infrastructure-based basic service set (BSS), independent service sets (IBSSs), and extended service sets (ESSs). Embodiments of the present invention may apply to any network node and are not limited to a specific type of network node.

Accordingly, methods and apparatuses for providing a multiple-input network node with a reduced-receive capability state that includes both scanning and power-saving modes for at least one receive chain are described. Although the present invention has been described in terms of the above-illustrated embodiments, it will be appreciated by those of ordinary skill in the art that a wide variety of alternate and/or equivalent implementations calculated to achieve the same purposes may be substituted for the specific embodiments shown and described without departing from the scope of the present invention. Those with skill in the art will readily appreciate that the present invention may be implemented in a very wide variety of embodiments. This description is intended to be regarded as illustrative instead of restrictive on embodiments of the present invention.

What is claimed is:

1. A network node comprising:
   a first receive chain;
   a second receive chain; and
   a management entity coupled to the first and second receive chains and configured
      to control the first and second receive chains to cooperate to receive communication from another network node over a channel while the network node is in a first receive-capability state, and
      to control the first receive chain to receive communication over the channel and the second receive chain to alternate between a power-down mode and a scanning mode while the network node is in a second receive-capability state that provides the network node with less receive capabilities than the first receive-capability state.

2. The network node of claim 1, wherein the management entity is further configured to switch the network node between the first receive-capability state and the second receive-capability state based at least in part on an occurrence of a power-down event.

3. The network node of claim 2, wherein the power-down event is defined by a network protocol.

4. The network node of claim 2, further comprising:
   a countdown timer sellable to a predetermined value, and
      the management entity is further configured to initiate the countdown timer to count down, following transmission of a frame by the network node, to reset the countdown timer upon receipt of communication over the channel, and to consider an expiration of the countdown timer as an occurrence of a power-down event.

5. The network node of claim 2, wherein the management entity is further configured to
   switch the network node from the first receive-capability state to the second receive-capability state after the occurrence of the power-down event.

6. The network node of claim 1, wherein the management entity is further configured to
switch the network node from the second receive-capability state to the first receive-capability state following an occurrence of a power-up event.

7. The network node of claim 6, wherein the occurrence of the power-up event is based at least in part on receipt of a signal over the channel.

8. A method comprising:
controlling a first and a second receive chain of a network node in a manner to cooperatively receive communication over a channel from another network node while the network node is in a first receive-capability state; and
controlling the first receive chain in a manner to receive communication over the channel and the second receive chain in a manner to alternate between a power-down mode and a scanning mode while the network node is in a second receive-capability state that provides the network node with less receive capabilities than the first receive-capability state.

9. The method of claim 8, further comprising:
switching the network node between the first receive-capability state and the second receive-capability state based at least in part on an occurrence of a power-down event.

10. The method of claim 9, wherein the power-down event is defined by a network protocol.

11. The method of claim 9, further comprising:
switching the network node from the first receive-capability state to the second receive-capability state following an occurrence of the power-down event; and
switching the network node from the second receive-capability state to the first receive-capability state following an occurrence of a power-up event.

12. The method of claim 11, further comprising:
receiving a signal over the channel, the occurrence of the power-up event based at least in part on said receiving the signal.

13. A system comprising:
a mobile power source to provide electrical energy to a network node;
a first receive chain of the network node;
a second receive chain of the network node; and
a management entity of the network node coupled to mobile power source, the first receive chain, and the second receive chain, the management entity configured
to control the first and second receive chains to cooperate to enable receipt of communication from another network node over a channel while the network node is in a first receive-capability state, and
to control the first receive chain to enable receipt of communication over the channel and the second receive chain to alternate between a power-down mode and a scanning mode while the network node is in a second receive-capability state that provides the network node with less receive capabilities than the first receive-capability state.

14. The system of claim 13, wherein the management entity is further configured to switch the network node between the first receive-capability state and the second receive-capability state based at least in part on an occurrence of a power-down event.

15. The system of claim 14, wherein the power-down event is defined by a network protocol.

16. The system of claim 14, further comprising:
a countdown timer sellable to a predetermined value, and the management entity is further configured to initiate the countdown timer to count down, following transmission of a frame by the network node, to reset the countdown timer upon receipt of communication over the channel, and to consider an expiration of the countdown timer as an occurrence of a power-down event.

17. The system of claim 14, wherein the management entity is further configured to
switch the network node from the first receive-capability state to the second receive-capability state after the occurrence of the power-down event.

18. The system of claim 13, wherein the management entity is further configured to
switch the network node from the second receive-capability state to the first receive-capability state following an occurrence of a power-up event.

19. The system of claim 18, wherein the occurrence of the power-up event is based at least in part on receipt of a signal over the channel.

20. The system of claim 13, wherein the system is a network node selected from the group consisting of a handheld computing device, a laptop computing device, and a wireless mobile phone.

21. An article comprising
a non-transitory storage medium; and
instructions stored in the storage medium, when executed by a processor, cause the processor to:
control a first and a second receive chain of a network node in a manner to cooperatively receive communication from another network node over a channel while the network node is in a first receive-capability state; and
control the first receive chain in a manner to receive communication over the channel and the second receive chain in a manner to alternate between a power-down mode and a scanning mode while the network node is in a second receive-capability state that provides the network node with less receive capabilities than the first receive-capability state.

22. The article of claim 21, wherein the instructions stored in the storage medium, when executed by the processor, further cause the processor to:
switch the network node between the first receive-capability state and the second receive-capability state based at least in part on an occurrence of a power-down event.

23. The article of claim 22, wherein the instructions stored in the storage medium, when executed by the processor, further cause the processor to:
switch the network node from the first receive-capability state to the second receive-capability state following an occurrence of the power-down event; and
switch the network node from the second receive-capability state to the first receive-capability state following an occurrence of a power-up event.

24. The article of claim 22, wherein the power-down event is defined by a network protocol.

* * * * *